US010962490B2

(12) United States Patent
Mortensen et al.

(10) Patent No.: US 10,962,490 B2
(45) Date of Patent: Mar. 30, 2021

(54) METHODS FOR ALIGNING A SPECTROMETER

(71) Applicant: UNIVERSITY OF WASHINGTON, Seattle, WA (US)

(72) Inventors: Devon R. Mortensen, Seattle, WA (US); Gerald Todd Seidler, Seattle, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 0 days.

(21) Appl. No.: 16/066,500

(22) PCT Filed: Dec. 28, 2016

(86) PCT No.: PCT/US2016/068837
§ 371 (c)(1),
(2) Date: Jun. 27, 2018

(87) PCT Pub. No.: WO2017/117197
PCT Pub. Date: Jul. 6, 2017

(65) Prior Publication Data
US 2019/0011381 A1 Jan. 10, 2019

Related U.S. Application Data

(60) Provisional application No. 62/271,992, filed on Dec. 28, 2015.

(51) Int. Cl.
*G01N 23/20* (2018.01)
*G01N 23/20008* (2018.01)
(Continued)

(52) U.S. Cl.
CPC ......... *G01N 23/2076* (2013.01); *G01N 23/20* (2013.01); *G01N 23/207* (2013.01);
(Continued)

(58) Field of Classification Search
CPC ............. G01N 23/20; G01N 23/20008; G01N 23/20016; G01N 23/20083;
(Continued)

(56) References Cited

U.S. PATENT DOCUMENTS 2,898,469 A   8/1959   Rose
3,566,111 A * 2/1971   Harm ................. G01N 23/2076
                                                        378/82

(Continued)

FOREIGN PATENT DOCUMENTS

CA       2 263 257        2/1999
JP        S6180447 U      5/1986
WO    WO 2009/037432      3/2009

OTHER PUBLICATIONS

The International Search Report (ISR) for PCT/US2016/068837 dated Apr. 25, 2017, pp. 1-8.
(Continued)

*Primary Examiner* — Allen C. Ho
(74) *Attorney, Agent, or Firm* — McDonnell Boehnen Hulbert & Berghoff LLP

(57) ABSTRACT

An example method for aligning a spectrometer is described herein. The spectrometer includes a radiation source, a crystal analyzer, and a detector that are all positioned on an instrument plane. The method includes rotating the crystal analyzer about an axis that is within the instrument plane and perpendicular to a rotation plane such that (i) a reciprocal lattice vector of the crystal analyzer is within the instrument plane or (ii) a component of the reciprocal lattice vector within the rotation plane is perpendicular to the instrument plane. An origin of the reciprocal lattice vector is located on the axis. The method further includes tilting the crystal analyzer or translating the detector such that the reciprocal lattice vector bisects a line segment that is bounded by the
(Continued)

US 10,962,490 B2
Page 2 detector and the radiation source. Example spectrometers related to the example method are also disclosed.

18 Claims, 10 Drawing Sheets

(51) Int. Cl.
  *G01N 23/20016* (2018.01)
  *G01N 23/20091* (2018.01)
  *G01N 23/207* (2018.01)
  *G01N 23/22* (2018.01)
  *G21K 1/06* (2006.01)

(52) U.S. Cl.
  CPC . *G01N 23/20008* (2013.01); *G01N 23/20016* (2013.01); *G01N 23/20083* (2013.01); *G01N 23/20091* (2013.01); *G01N 23/22* (2013.01); *G21K 1/06* (2013.01); *G21K 2201/06* (2013.01); *G21K 2201/062* (2013.01); *G21K 2201/064* (2013.01); *G21K 2201/067* (2013.01)

(58) Field of Classification Search
  CPC ........... G01N 23/20091; G01N 23/207; G01N 23/2076; G01N 23/22; G21K 1/06; G21K 2201/06; G21K 2201/062; G21K 2201/064; G21K 2201/067
  USPC .... 378/44–46, 48–50, 70–90, 196, 197, 205
  See application file for complete search history.

(56) References Cited

U.S. PATENT DOCUMENTS

| | | | | |
|---|---|---|---|---|
| 3,577,159 | A * | 5/1971 | Sawada | F16H 27/04 250/310 |
| 3,628,015 | A * | 12/1971 | Franks | G01N 23/2076 378/82 |
| 3,906,225 | A * | 9/1975 | Guernet | G01N 23/2076 378/82 |
| 3,914,605 | A * | 10/1975 | Hara | G01N 23/20008 378/83 |
| 4,446,568 | A * | 5/1984 | Williams | G01N 23/207 378/3 |
| 4,562,585 | A * | 12/1985 | Göbel | G01N 23/2076 378/49 |
| 4,580,283 | A * | 4/1986 | Hornstra | G01N 23/2076 378/82 |
| 4,599,741 | A * | 7/1986 | Wittry | G01N 23/223 378/45 |
| 4,637,041 | A * | 1/1987 | Brinkgreve | G01N 23/20008 378/71 |
| 4,642,811 | A * | 2/1987 | Georgopoulos | G01N 23/085 378/53 |
| 4,667,679 | A | 5/1987 | Sahota | |
| 4,807,268 | A * | 2/1989 | Wittry | G01N 23/223 378/82 |
| 5,309,915 | A | 5/1994 | Ember | |
| 5,438,613 | A * | 8/1995 | Gijzen | G01N 23/207 378/82 |
| 5,509,043 | A * | 4/1996 | Van Der Sluis | G21K 1/06 378/70 |
| 5,647,369 | A | 7/1997 | Petrucelli et al. | |
| 5,790,628 | A * | 8/1998 | Ishida | G01T 1/36 378/83 |
| 5,892,809 | A * | 4/1999 | Wittry | G21K 1/06 378/45 |
| 5,914,997 | A * | 6/1999 | Van Egeraat | G01J 3/20 378/45 |
| 5,923,720 | A * | 7/1999 | Barton | B82Y 10/00 378/83 |
| 5,966,423 | A * | 10/1999 | Quinn | G01N 23/20025 378/79 |
| 6,259,763 | B1 * | 7/2001 | Bitter | G01N 23/20 378/82 |
| 6,456,688 | B1 * | 9/2002 | Taguchi | G21K 1/06 378/79 |
| 7,035,373 | B2 * | 4/2006 | Omote | G01N 23/20 378/71 |
| 7,069,791 | B2 | 7/2006 | Hashimoto et al. | |
| 7,120,228 | B2 * | 10/2006 | Yokhin | G01N 23/20008 378/90 |
| 7,471,766 | B2 * | 12/2008 | Dosho | G01N 23/20 378/71 |
| 7,503,896 | B2 | 3/2009 | Miele et al. | |
| 7,551,719 | B2 * | 6/2009 | Yokhin | G01N 23/20008 378/70 |
| 7,796,726 | B1 * | 9/2010 | Gendreau | G01N 23/20 378/44 |
| 7,801,272 | B2 * | 9/2010 | Toraya | G01N 23/207 378/71 |
| 7,848,489 | B1 * | 12/2010 | He | G01N 23/207 378/71 |
| 7,852,983 | B2 * | 12/2010 | Mettendorf | G01N 23/207 378/71 |
| 7,864,922 | B2 * | 1/2011 | Kawabe | G01N 23/2252 378/70 |
| 8,340,248 | B2 * | 12/2012 | Toraya | B82Y 10/00 378/70 |
| 8,548,123 | B2 * | 10/2013 | He | G01N 23/207 378/73 |
| 8,886,334 | B2 * | 11/2014 | Ghaffari | A61B 1/00082 607/115 |
| 9,218,315 | B2 * | 12/2015 | Mitsunaga | G06F 17/00 |
| 9,448,191 | B2 * | 9/2016 | Utaka | G01N 23/2076 |
| 9,678,023 | B2 * | 6/2017 | Kim | G01N 23/207 |
| 9,864,075 | B2 * | 1/2018 | Giencke | G01N 23/207 |
| 9,945,961 | B2 * | 4/2018 | Sakumura | G01T 1/24 |
| 10,441,185 | B2 * | 10/2019 | Rogers | A61B 5/04085 |
| 2008/0214949 | A1 | 9/2008 | Stivoric et al. | |
| 2009/0221894 | A1 | 9/2009 | Myklebust et al. | |
| 2011/0007869 | A1 | 1/2011 | Gendreau et al. | |
| 2013/0006112 | A1 | 1/2013 | Vardy | |
| 2013/0041235 | A1 | 2/2013 | Rogers et al. | |
| 2013/0138382 | A1 | 5/2013 | Mitsunaga et al. | |
| 2015/0051468 | A1 | 2/2015 | Srinivasa et al. | |
| 2015/0099976 | A1 | 4/2015 | Ghaffari et al. | |
| 2015/0330918 | A1 | 11/2015 | Kim et al. | |

OTHER PUBLICATIONS

Written Opinion of the International Searching Authority for PCT/US2016/068837 dated Apr. 25, 2017, pp. 1-6.
Mortensen, Devon R. et al. "Robust optic alignment in a tilt-free implementation of the Rowland circle spectrometer" Journal of Electron Spectroscopy and Related Phenomena (2017) vol. 215, pp. 8-15.
"Rowland Circle Geometry based X-ray Spectrometer Alignment Guide"; XRS TECH LLC; Article [online]. May 23, 2012 [retrieved Mar. 3, 2017]. Retrieved from the Internet: <URL:http://xrstech.com/wp-contenVuploads/2015/05/spectrometer-alignment-b-1.pdf>; figure 1, p. 1, paragraph 1, p. 2. steps 1a-e.
Armstrong et al., "The 'SiteRite' ultrasound machine—an aid to internal jugular vein cannulation" Anaesthesia 48:319-24 (1993).
Denys et al., "Ultrasound-assisted cannulation of the internal jugular vein. A prospective comparison to the external landmark—guided technique" Circulation 87(5):1557-62 (May 1993).
Gautschi, (2002). Piezoelectric sensorics. Springer-Verlag Berlin, Heidelberg, New York. 13 pages.
Gilbert et al., "Facilitation of internal jugular venous cannulation using an audio-guided Doppler ultrasound vascular access device" Critical care medicine 23(1):60-65 (Jan. 1995).
Kleymenov et al., "Five-element Johann-type x-ray emission spectrometer with a single-photon-counting pixel detector" Rev Sci Instr 82(6):65107-1-65107-7 (Jun. 2011).

(56) References Cited

OTHER PUBLICATIONS

Okuyan et al., "Angiographic Evaluation of the Radial Artery Diameter in Patients Who Underwent Coronary Angiography or Coronary Intervention." Journal of Invasive Cardiology 25(7):353-357 (Jul. 2013).

Engadget—World's Smallest LED—PicoLED; http://www.engadget.com/2007/01/23/rohm-unveils-worlds-smallest-led-picoled/ pp. 1-8. (2019).

Crystaline II Temperature Trend Indicators—http://www.sharn.com/temp-monitoring/a/Crystaline2-Temperature-Trend-Indicators/geoloc/US/ 1 page (2019).

* cited by examiner

METHODS FOR ALIGNING A SPECTROMETER

CROSS-REFERENCE TO RELATED APPLICATION

This application is a U.S. national phase of International Application No. PCT/US2016/068837, filed on Dec. 28, 2016, which claims priority to U.S. Provisional Application No. 62/271,992, filed Dec. 28, 2015, both of which are incorporated by reference herein in their entirety.

STATEMENT REGARDING FEDERALLY SPONSORED RESEARCH OR DEVELOPMENT

This invention was made with government support under Contract Numbers DE-FG02-09ER16106 and DE-SC0008580, awarded by the United States Department of Energy. The government has certain rights in the invention.

BACKGROUND

Unless otherwise indicated herein, the materials described in this section are not prior art to the claims in this application and are not admitted to be prior art by inclusion in this section.

Many x-ray spectrometers use a curved crystal analyzer (CCA) to monochromatize x-rays for illumination of a sample or to monochromatize x-rays that are emitted from, or transmitted through, the sample. A CCA is typically fabricated by gluing or bonding a Si or Ge wafer in a concave glass lens or other concave form. The crystallographic orientation of the wafer surface is chosen so that the spacing between crystal planes nominally parallel to the surface is appropriate, via Bragg's law, to generate constructive interference of x-rays within the energy or wavelength range of interest.

The CCA will generally exhibit a miscut that results in a reciprocal lattice vector of the CCA having a non-zero tilt with respect to the surface vector exposed by the miscut. The non-zero tilt can be corrected via tilting the CCA about two perpendicular axes such that the reciprocal lattice vector of the CCA is properly aligned with respect to the source and the detector. Depending on the spectrometer and on the magnitude of the miscut, using two-tilt correction to align the CCA for proper operation of the spectrometer may take several hours. Two-axis tilt correction is generally accomplished via two sets of motorized micrometers, which adds cost and complexity. Additionally, two-axis tilt correction might be required each time a particular CCA is used.

SUMMARY

In one example, a method for aligning a spectrometer is provided. The spectrometer includes a radiation source, a crystal analyzer, and a detector that are all positioned on an instrument plane. The method includes rotating the crystal analyzer about an axis that is within the instrument plane and perpendicular to a rotation plane such that (i) a reciprocal lattice vector of the crystal analyzer is within the instrument plane or (ii) a component of the reciprocal lattice vector within the rotation plane is perpendicular to the instrument plane. An origin of the reciprocal lattice vector is located on the axis. The method further includes tilting the crystal analyzer or translating the detector such that the reciprocal lattice vector bisects a line segment that is bounded by the detector and the radiation source.

In another example, a non-transitory computer readable medium stores instructions that, when executed by a computing device, cause the computing device to perform functions. The functions include rotating, via a motor, the crystal analyzer about an axis that is within the instrument plane and perpendicular to a rotation plane such that (i) a reciprocal lattice vector of the crystal analyzer is within the instrument plane or (ii) a component of the reciprocal lattice vector within the rotation plane is perpendicular to the instrument plane. An origin of the reciprocal lattice vector is located on the axis. The functions further include tilting, via a motor, the crystal analyzer or translating, via a motor, the detector such that the reciprocal lattice vector bisects a line segment that is bounded by the detector and the radiation source.

In yet another example, a computing device includes one or more processors and a non-transitory computer readable medium storing instructions that, when executed by the one or more processors, cause the computing device to perform functions. The functions include rotating, via a motor, the crystal analyzer about an axis that is within the instrument plane and perpendicular to a rotation plane such that (i) a reciprocal lattice vector of the crystal analyzer is within the instrument plane or (ii) a component of the reciprocal lattice vector within the rotation plane is perpendicular to the instrument plane. An origin of the reciprocal lattice vector is located on the axis. The functions further include tilting, via a motor, the crystal analyzer or translating, via a motor, the detector such that the reciprocal lattice vector bisects a line segment that is bounded by the detector and the radiation source.

In yet another example, a spectrometer includes a stage configured to hold a crystal analyzer. The stage is rotatable about a first axis that is within an instrument plane of the spectrometer, the stage is rotatable about a second axis that is within the instrument plane or perpendicular to the instrument plane, and the stage is rotationally fixed about a third axis that is perpendicular to both the first axis and the second axis. The spectrometer further includes a radiation source that is located on the instrument plane and (i) aligned to emit radiation toward the stage or (ii) aligned to emit radiation toward a sample, thereby causing radiation to be emitted toward the stage. The spectrometer further includes a detector that is located on the instrument plane and configured to detect radiation that is scattered by the crystal analyzer.

In yet another example, a spectrometer includes a stage configured to hold a crystal analyzer. The stage is rotatable about a first axis that is within an instrument plane of the spectrometer, the stage is rotationally fixed about a second axis that is perpendicular to the first axis, and the stage is rotationally fixed about a third axis that is perpendicular to both the first axis and the second axis. The spectrometer further includes a radiation source that is located on the instrument plane and (i) aligned to emit radiation toward the stage or (ii) aligned to emit radiation toward a sample, thereby causing radiation to be emitted toward the stage. The spectrometer further includes a detector that is located on the instrument plane and configured to detect radiation that is scattered by the crystal analyzer. The spectrometer further includes a mechanism configured to translate the detector within the instrument plane such that the detector is positioned to detect radiation scattered by the crystal analyzer.

When the term "substantially" or "about" is used herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. In some examples disclosed herein, "substantially" or "about" means within +/−5% of the recited value.

Various embodiments disclosed herein may be discussed in further detail in "Robust optic alignment in a tilt-free implementation of the Rowland circle spectrometer," by Devon R. Mortensen and Gerald T. Seidler, which is hereby incorporated by reference in its entirety (available at http://www.sciencedirect.com/science/article/pii/S0368204816301025).

These, as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible.

DETAILED DESCRIPTION

As mentioned above, one approach for addressing spectrometer alignment errors caused by a crystal analyzer formed from a miscut wafer is to use two-axis tilt correction. Other approaches for alleviating alignment errors are disclosed herein. These approaches involve rotating the crystal analyzer about an axis that is within an instrument plane (e.g., a Rowland circle) of the spectrometer. By finding a maximum intensity of diagnostic signals corresponding respectively to various rotational positions of the crystal analyzer, one can determine a first rotational position at which a reciprocal lattice vector of the crystal analyzer is within the instrument plane. Alternatively, by finding a minimum intensity of diagnostic signals corresponding respectively to various rotational positions of the crystal analyzer, one can determine a second rotational position at which a projection of the reciprocal lattice vector upon the plane of rotation is perpendicular to the instrument plane.

From the first rotational position, the reciprocal lattice vector of the crystal analyzer can be tilted within the instrument plane to bisect a line segment that is bounded by a detector of the spectrometer and a radiation source of the spectrometer. This constitutes proper alignment of the spectrometer that satisfies the Rowland circle condition. Instead of tilting the crystal analyzer after the rotation, the detector can be translated into a position such that the reciprocal lattice vector of the crystal analyzer bisects the (changed) line segment that is bounded by the detector and the radiation source. This also constitutes proper alignment of the spectrometer that satisfies the Rowland circle condition.

From the second rotational position, the reciprocal lattice vector of the crystal analyzer can be tilted into the instrument plane to bisect a line segment that is bounded by the detector and the radiation source.

Figure 1:
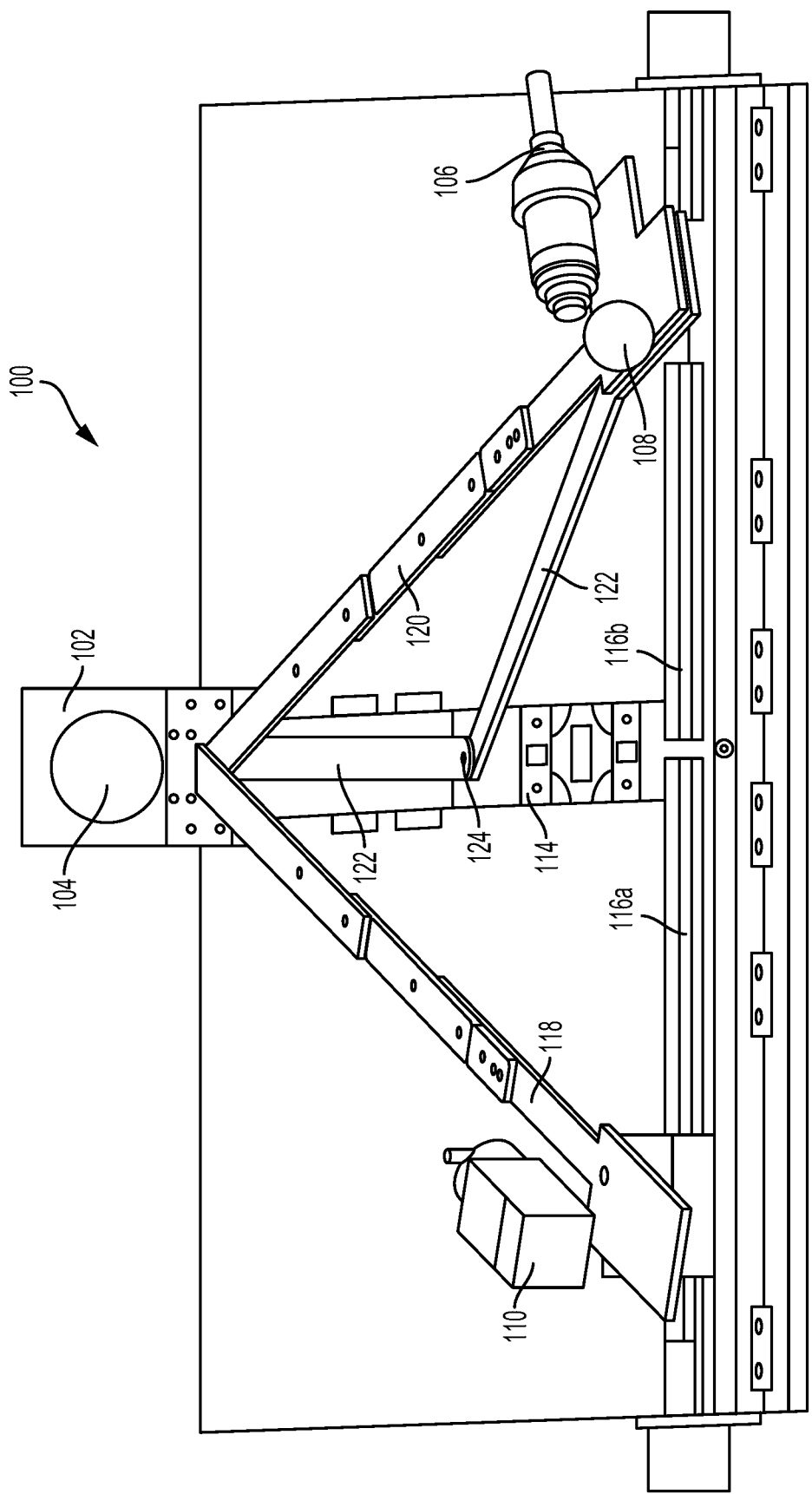
FIG. 1 depicts a spectrometer, according to an example embodiment.

Referring now to the Figures, FIG. 1 is a partially upward looking view of a spectrometer 100. The spectrometer 100 includes a stage 102, a crystal analyzer 104, a radiation source 106, a sample 108, a detector 110, a frame 114, a rail 116a, a rail 116b, an arm 118, an arm 120, and a hinged arm 122. The hinged arm 122 includes a hinge 124.

The stage 102 is configured to hold the crystal analyzer 104 in place during operation of the spectrometer 100. Various embodiments of the stage 102 may include clips and/or slots that operate to hold the crystal analyzer 104 in place. The stage 102 is shown in more detail in FIG. 3.

The crystal analyzer 104 is composed of a crystalline material such as silicon or germanium, for example. The crystal analyzer 104 may take the form of a spherically curved crystal analyzer or a doubly-curved crystal analyzer having at least one axis of rotational symmetry. The crystal analyzer 104 is configured to receive radiation (e.g., x-rays) that are emitted by, or transmitted through, the sample 108. The crystal analyzer 104 may operate by selectively scattering, via Bragg reflection, radiation within a particular wavelength/energy band based on the lattice spacing of the crystal analyzer 104 and orientation of the crystal analyzer 104 with respect to the sample 108 or based on the orientation of the crystal analyzer 104 with respect to the radiation source 106.

The radiation source 106 may take the form of an x-ray source (e.g., an x-ray tube), but other examples are possible. The radiation source 106 may be configured to emit x-rays or other radiation towards the sample 108. In a particular emission mode, the radiation impacting the sample 108 may cause the sample 108 to emit further radiation toward the crystal analyzer 104. In some transmission mode configurations, some of the radiation emitted by the radiation source 106 transmits through the sample 108 toward the crystal analyzer 104.

In other examples, the sample 108 is positioned near the detector 110 instead of the radiation source 106, contrary to what is shown in FIG. 1. The radiation source 106 may be aligned to emit radiation (e.g., x-rays) directly toward the crystal analyzer 104, and the crystal analyzer 104 may monochromatize radiation received directly from the radiation source 106. The monochromatized radiation may then illuminate the sample 108 and radiation that is either transmitted through or emitted from the sample 108 may be received by the detector 110.

The sample 108 may generally include any material sample of interest.

The detector 110 may take the form of any camera, line detector, or point detector configured to detect counts, intensity, and/or energy/wavelength of radiation (e.g., x-rays) that are scattered by the crystal analyzer 104 and/or absorbed by, transmitted by, or emitted from the sample 108. The detector 110 may also include a mechanism (e.g., one or more motorized or non-motorized micrometers) configured to move the detector 110 relative to the crystal analyzer 104 and/or the radiation source 106.

The frame 114 may be made of metal or other materials and provide structural support for other components of the spectrometer 100.

The radiation source 106 is coupled to the rail 116b to allow movement of the radiation source 106 along the rail 116b. Similarly, the detector 110 is coupled to the rail 116a to allow movement of the detector 110 along the rail 116a. In various examples, the rails 116a and 116b are collinear or non-colinear.

The arm 118 couples the detector 110 to the stage 102. More specifically, the arm 118 is configured to track and aim the detector 110 at the crystal analyzer 104 as the detector 110 is moved along the rail 116a.

The arm 120 couples the radiation source 106 to the stage 102. More specifically, the arm 120 is configured to track and aim the radiation from the radiation source 106 (in direct illumination) or from the sample 108 (in x-ray emission) to impinge on the crystal analyzer 104 as the radiation source 106 and/or the sample 108 are moved along the rail 116b. The arm 120 maybe extensible, e.g., telescoping as shown in FIG. 1 and FIG. 2, or might otherwise not constrain the distance between various components of the spectrometer 100.

The hinged arm 122 has two sections of length each approximately equal to the radius of the Rowland circle. The two sections are connected at the hinge 124. The hinged arm 122 functions so that the hinge 124 serves as the center of the Rowland circle and the crystal analyzer 104 necessarily tracks the motion of the Rowland circle as determined by the location of the radiation source 106 and/or the detector 110.

Figure 2:
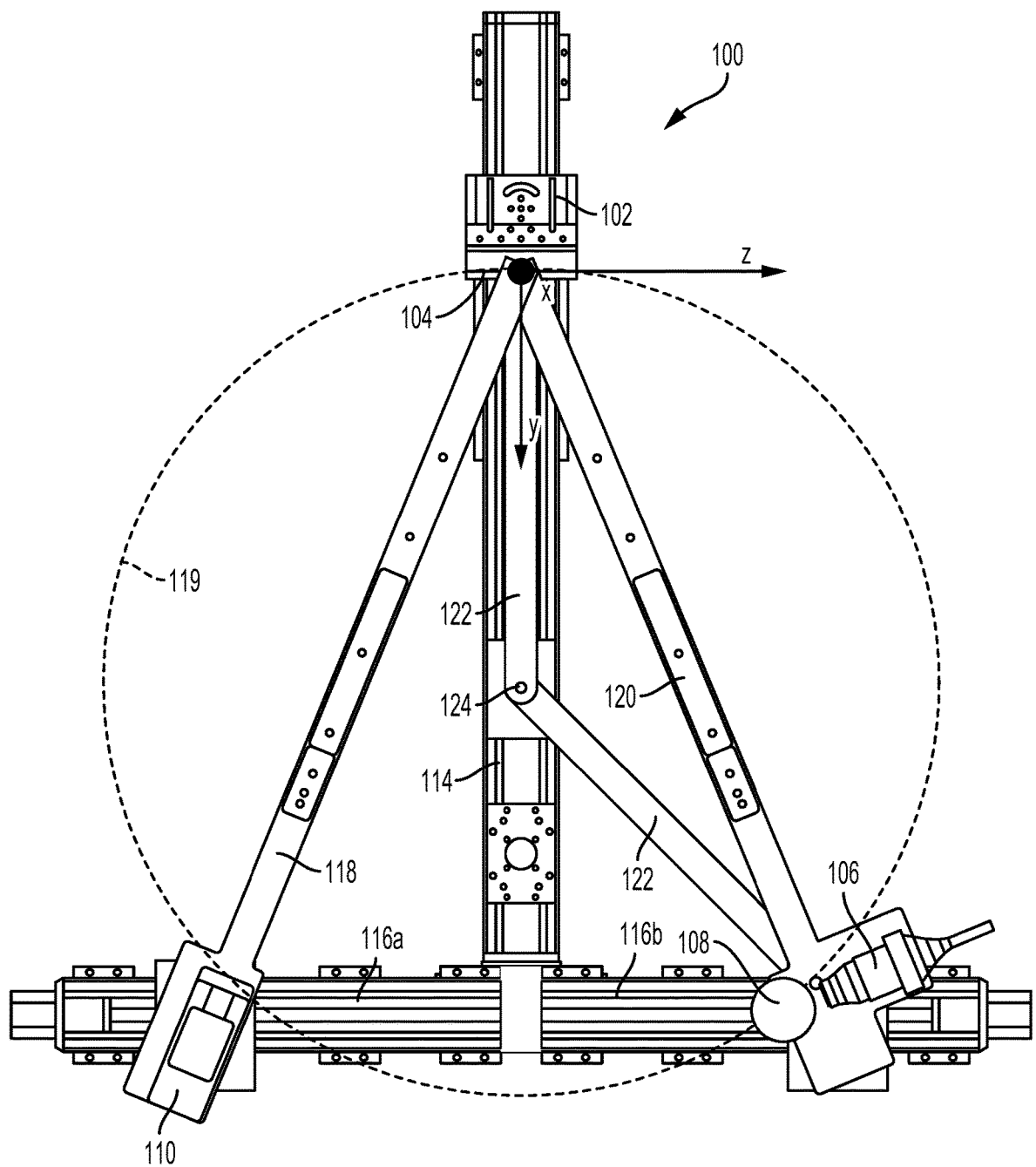
FIG. 2 depicts a spectrometer, according to an example embodiment.

FIG. 2 is a top view of the spectrometer 100, with x, y, and z axes labeled for reference. The crystal analyzer 104 is obscured in the view of FIG. 2 because its face is normal to the illustration plane.

The stage 102 may be configured to rotate the crystal analyzer 104 about one, two, or three axes (x, y, z) depending on the implementation. In some examples, the stage 102 includes one, two, or three sets of motorized or non-motorized micrometers that can be used to rotate or tilt the crystal analyzer 104 about any of the x, y, or z axes. Herein, the y-z plane may be referred to as the instrument plane and the x-z plane may be referred to as the rotation plane. The radiation source 106, the sample 108, the crystal analyzer 104, and the detector 110 may all be positioned within the instrument plane.

The arm 118, the arm 120, and the rails 116a and 116b are further configured to restrict movement of the stage 102, the detector 110, and the radiation source 106 such that the stage 102, the detector 110, and the radiation source 106 remain positioned on a circle 119.

The hinged arm 122 restricts movement of the stage 102 such that the stage 102 remains at a fixed distance from the center of a circle 119 (e.g., the hinge 124). The hinged arm 122 restricts movement of the radiation source 106 such that the radiation source 106 also remains at the fixed distance from the center of the circle 119 (e.g., the hinge 124).

Figure 3:
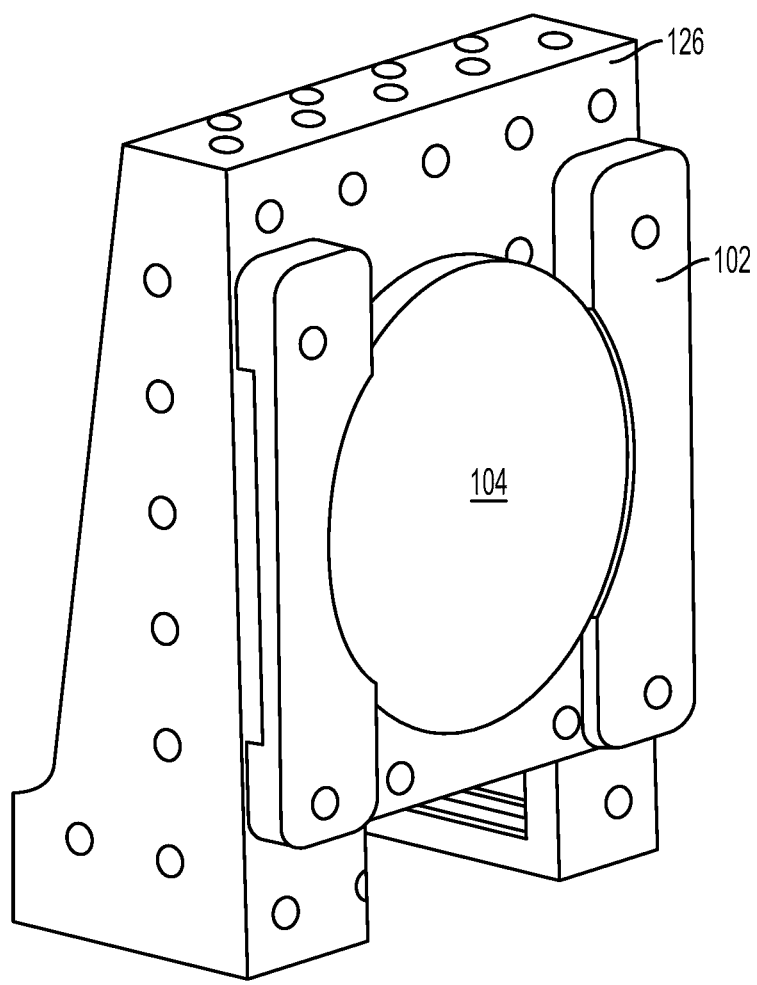
FIG. 3 depicts a stage mounted on a bracket, according to an example embodiment.

FIG. 3 is a close up view of the crystal analyzer 104 mounted to a bracket 126 via the stage 102. The bracket 126 is mountable to the frame 114. The bracket 126 may take the form of a right-angle bracket. In this example, the stage 102 does not include capabilities for tilt or rotating the crystal analyzer 104, aside from rotating the crystal analyzer 104 within the stage 102 when the stage 102 is loosened.

Figure 4:
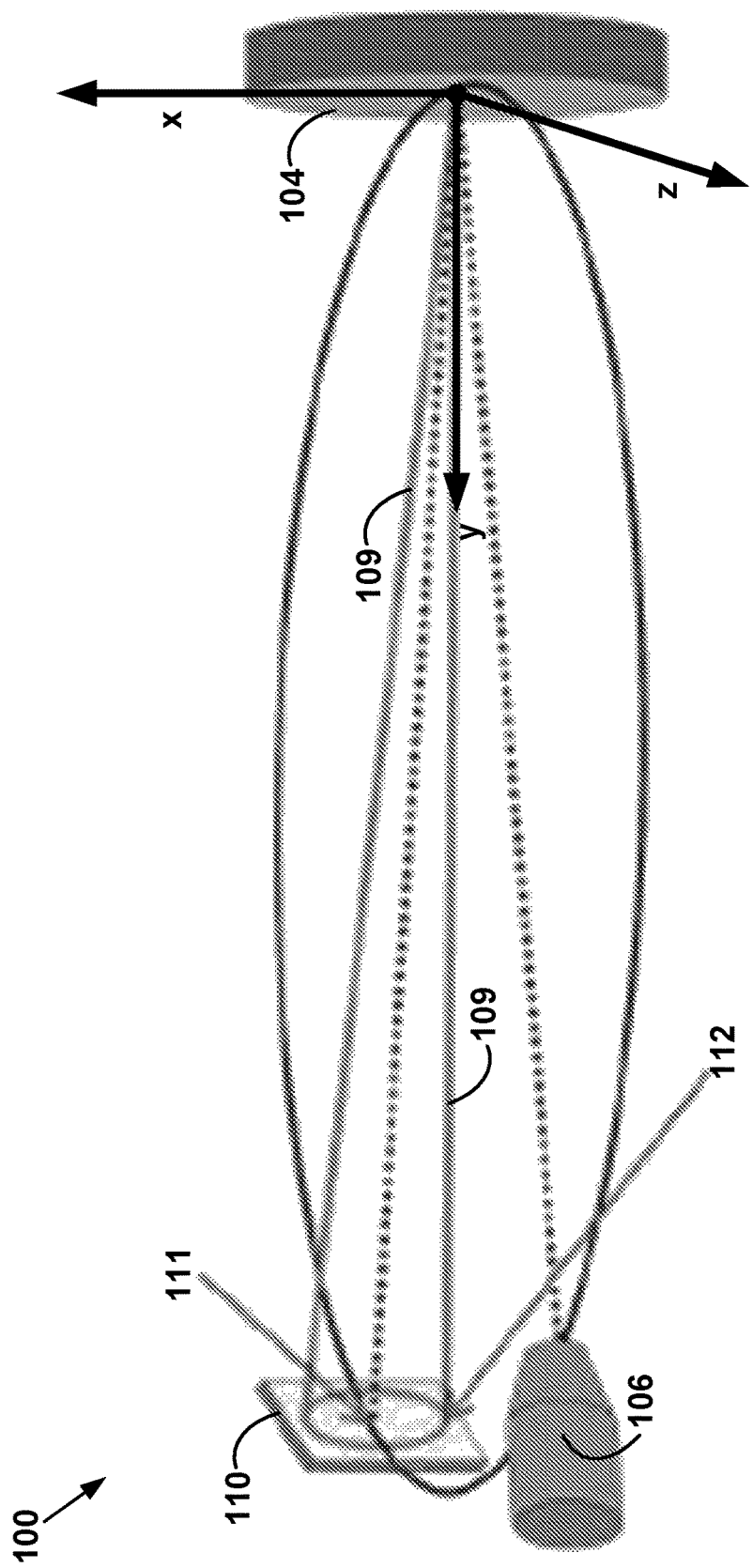
FIG. 4 depicts some components of a spectrometer, according to an example embodiment.

FIG. 4 depicts select components of the spectrometer 100. The radiation source 106, the crystal analyzer 104, and the detector 110 are all positioned on the y-z instrument plane of the spectrometer 100. The sample 108 is omitted from FIG. 4 for simplicity. As shown, an ideal crystal analyzer 104 (not having a miscut) would scatter radiation received from the radiation source 106 (e.g., directly or via the sample 108) to a point 111 within the y-z instrument plane. However, the crystal analyzer 104 will generally be imperfect due to a miscut error, resulting in a reciprocal lattice vector 109 that is not aligned with the point 111. As the crystal analyzer 104 is rotated about the y-axis, the reciprocal lattice vector 109 traces a circle 112 having a center at the point 111.

Figure 5:
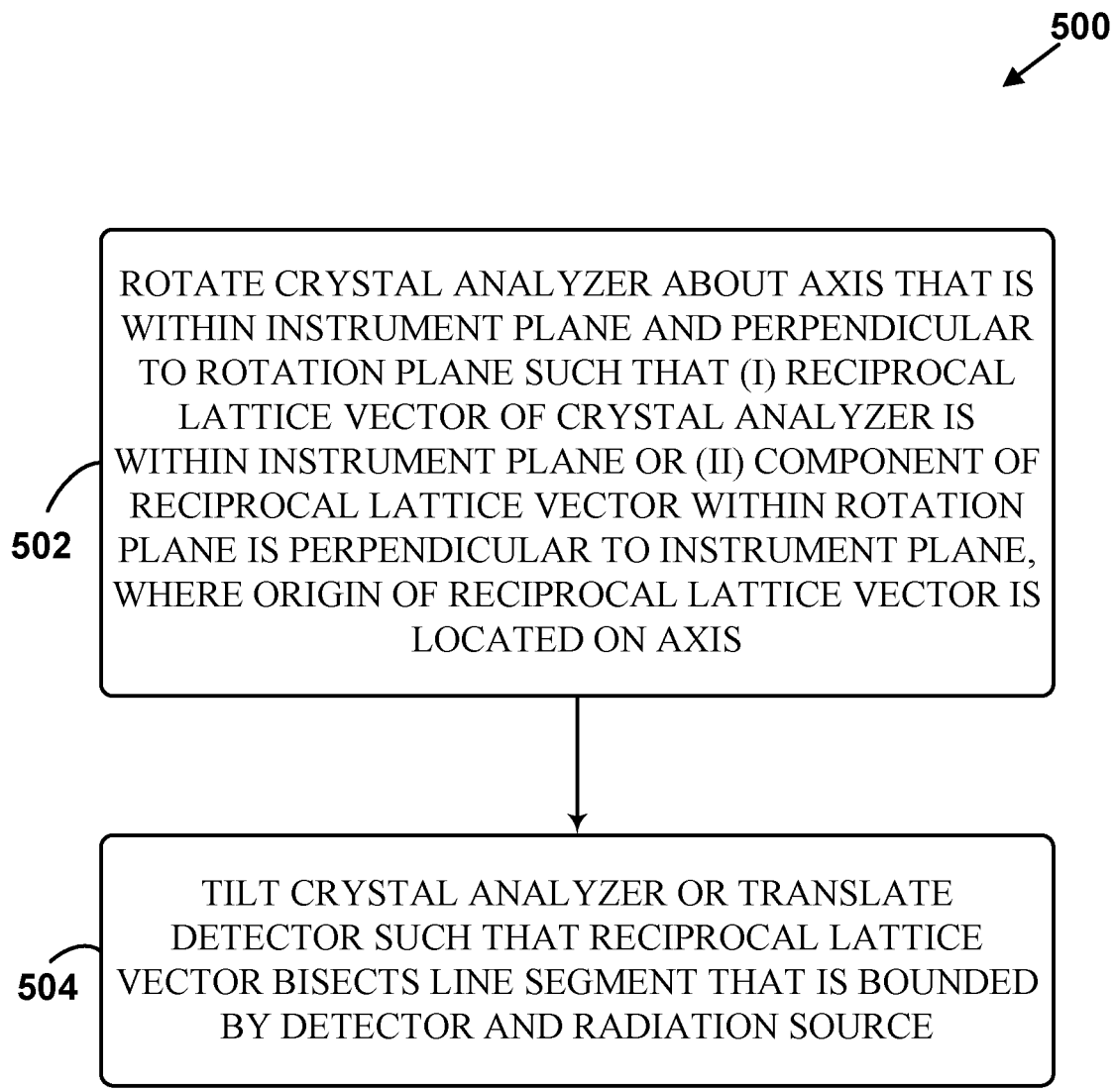
FIG. 5 is a block diagram of an example method, according to an example embodiment.

FIG. 5 is a block diagram of an example method 500 for aligning a spectrometer 100. A radiation source 106, a crystal analyzer 104, and a detector 110 of the spectrometer 100 are all positioned on an instrument plane.

At block 502, the method 500 includes rotating the crystal analyzer 104 about an axis that is within the instrument plane and perpendicular to a rotation plane such that (i) a reciprocal lattice vector 109 of the crystal analyzer 104 is within the instrument plane or (ii) a component of the reciprocal lattice vector 109 within the rotation plane is perpendicular to the instrument plane. An origin of the reciprocal lattice vector 109 is located on the axis.

At block 504, the method 500 includes tilting the crystal analyzer 104 or translating the detector 110 such that the reciprocal lattice vector 109 bisects a line segment that is bounded by the detector 110 and the radiation source 106.

Figure 6:
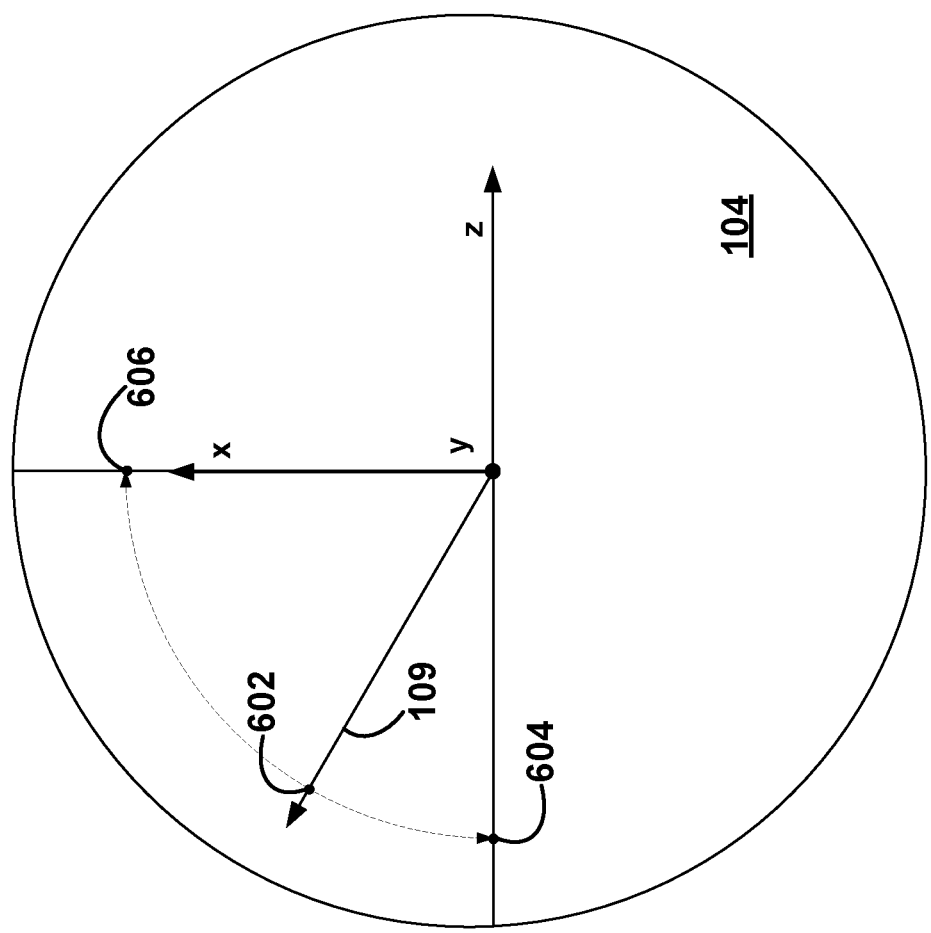
FIG. 6 depicts rotation of a crystal analyzer, according to an example embodiment.

FIG. 6 is a view of the x-z rotation plane. The crystal analyzer 104 may be rotated about the y-axis, via a motor or manually, such that the reciprocal lattice vector 109 is moved from point 602 to point 604. Point 604 is within the y-z instrument plane.

In practice, the crystal analyzer 104 may be rotated about the y-axis to a plurality of rotational positions to identify a target rotational position. For each rotational position of the plurality of rotational positions, one may determine an intensity of radiation that is emitted by the radiation source 106 and/or the sample 108, scattered by the crystal analyzer 104, and detected by the detector 110. The determined intensities corresponding respectively to the plurality of rotational positions may be evaluated to determine a target rotational position for the crystal analyzer 104. In this example, the target rotational position may correspond to the reciprocal lattice vector 109 being aligned with point 604. A maximum intensity of the determined intensities may correspond to the position 604 (or a point on the positive end of the z-axis). That is, the signal intensity may be greatest when the reciprocal lattice vector 109 is within the y-z instrument plane and/or on the Rowland circle.

Figure 7:
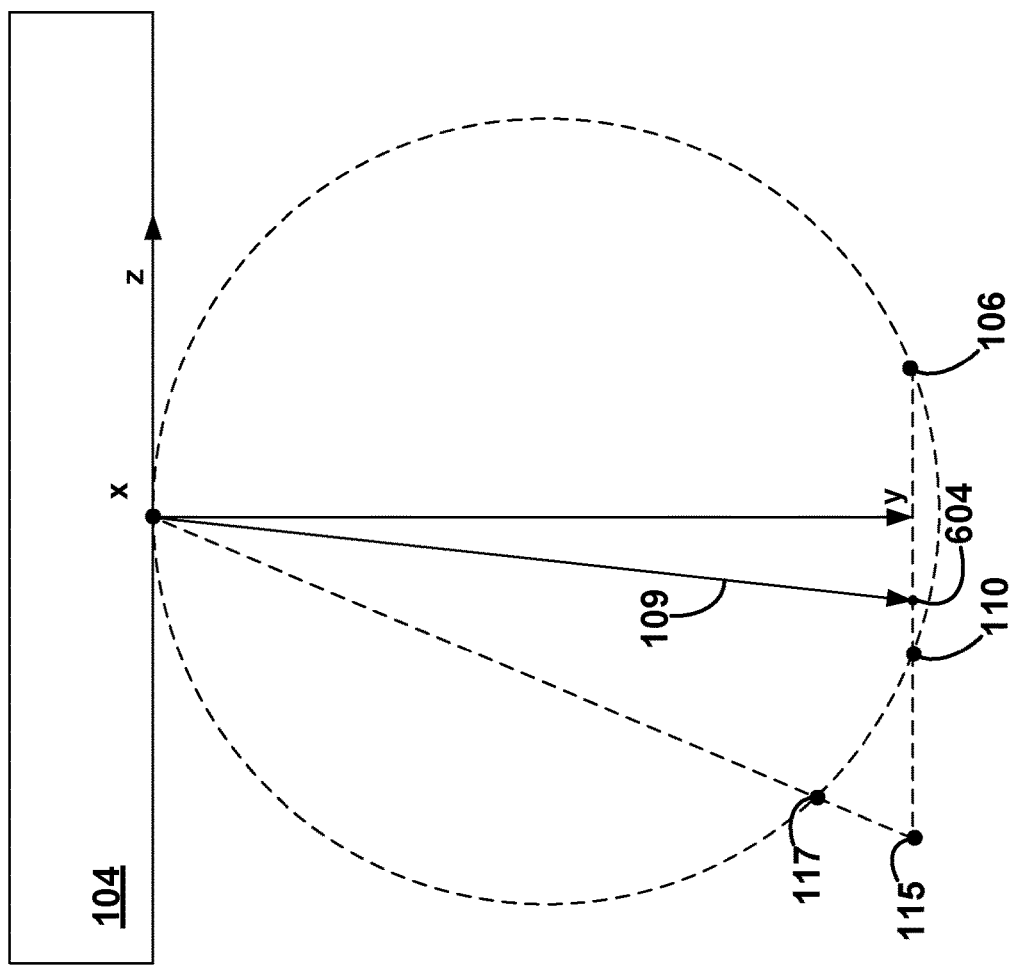
FIG. 7 depicts a location of a reciprocal lattice vector of a crystal analyzer and locations of components of a spectrometer, according to an example embodiment.

FIG. 7 is a view of the y-z instrument plane. FIG. 7 depicts the reciprocal lattice vector 109 after being rotated from point 602 to point 604. Since the reciprocal lattice vector 109 does not bisect a line segment bounded by the detector 110 and the radiation source 106, it may be useful to translate (e.g., move) the detector 110 to account for the misalignment. As such, the detector 110 may be moved, via a motor or manually, to position 115 or position 117 such that the reciprocal lattice vector 109 does bisect a line segment bounded by the detector 110 and the radiation source 106, to satisfy the Rowland Circle condition. This example may reflect an asymmetric configuration.

Once a suitable rotational position and a suitable detector position is identified for a particular crystal analyzer, this knowledge may be used in the future to perhaps eliminate the need for additional alignment efforts prior to further operation sessions that utilize the particular crystal analyzer. One way of doing this may include marking an edge of the crystal analyzer (e.g., with an ink marker) such that the marking is aligned with a structural feature or any other easily identifiable feature of the stage 102 or the spectrometer 100. This allows the crystal analyzer 104 to be removed from the spectrometer 100 and to be subsequently replaced into the spectrometer 100 and used without further alignment. One can realign the marking on the crystal analyzer 104 with the identified feature of the spectrometer 100. The detector 110 may also be translated or moved to the same position (e.g., position 115 or 117) at which the spectrometer 100 was previously properly aligned for that particular crystal analyzer.

Figure 8:
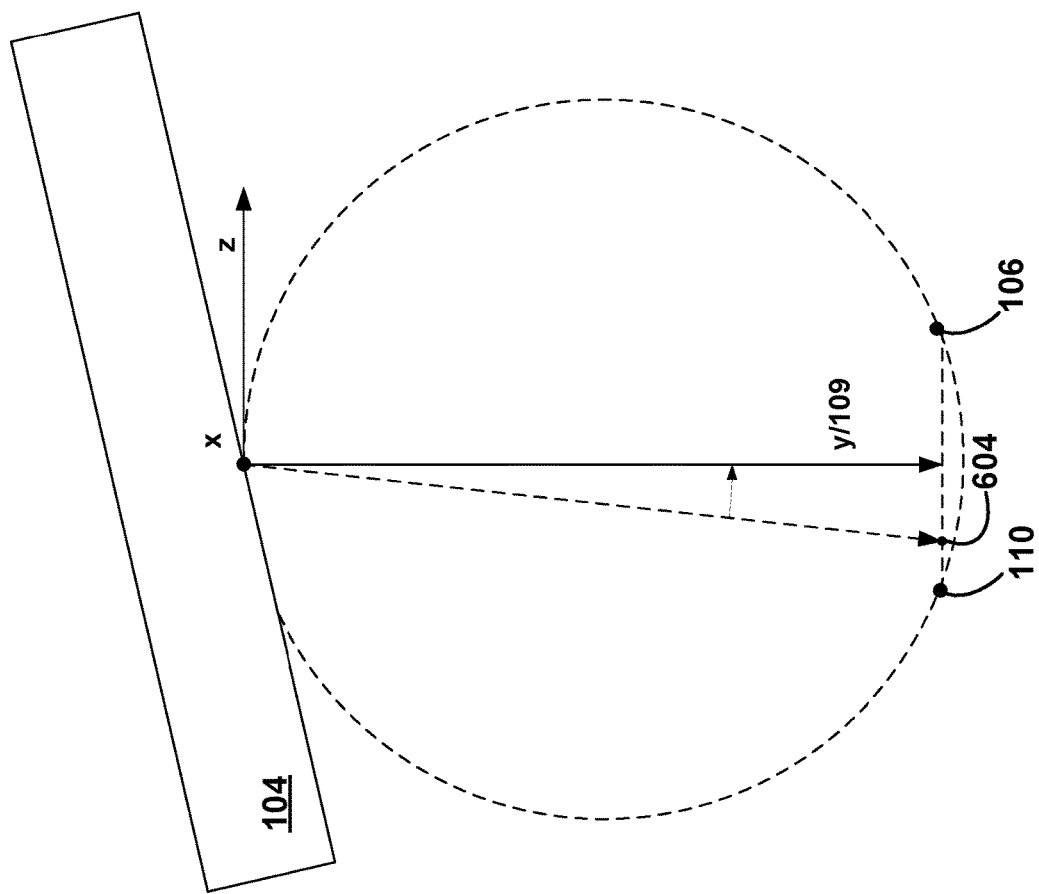
FIG. 8 depicts tilting of a crystal analyzer, according to an example embodiment.

FIG. 8 depicts compensating for misalignment via a one-axis tilt correction of the crystal analyzer 104 instead of translating the detector 110. The crystal analyzer 104 can be tilted about the x-axis such that the reciprocal lattice vector 109 moves from the position depicted in FIG. 7 to a position such that the reciprocal lattice vector 109 is aligned with the y-axis as shown in FIG. 8. The reciprocal lattice vector 109 now bisects the line segment bounded by the detector 110 and the radiation source 106, to satisfy the Rowland Circle condition. This example may reflect a symmetric configuration.

Referring back to FIG. 6, in another example the crystal analyzer 104 may be rotated about the y-axis, via a motor or manually, such that the reciprocal lattice vector 109 is moved from point 602 to point 606. At point 606, a projection of the reciprocal lattice vector 109 upon the x-z rotation plane is perpendicular to the y-z instrument plane.

In practice, the crystal analyzer 104 may be rotated about the y-axis to a plurality of rotational positions to identify a target rotational position. For each rotational position of the plurality of rotational positions, one may determine an intensity of radiation that is emitted by the radiation source 106 and/or the sample 108, scattered by the crystal analyzer 104, and detected by the detector 110. The determined intensities corresponding respectively to the plurality of rotational positions may be evaluated to determine a target rotational position for the crystal analyzer 104. In this example, the target rotational position may correspond to the reciprocal lattice vector 109 being aligned with point 606. A minimum intensity of the determined intensities may correspond to the position 606 (or a point on the negative end of the x-axis). That is, the signal intensity may be minimized when a projection of the reciprocal lattice vector 109 upon the x-z rotation plane is perpendicular to the y-z instrument plane and/or the Rowland circle.

Figure 9:
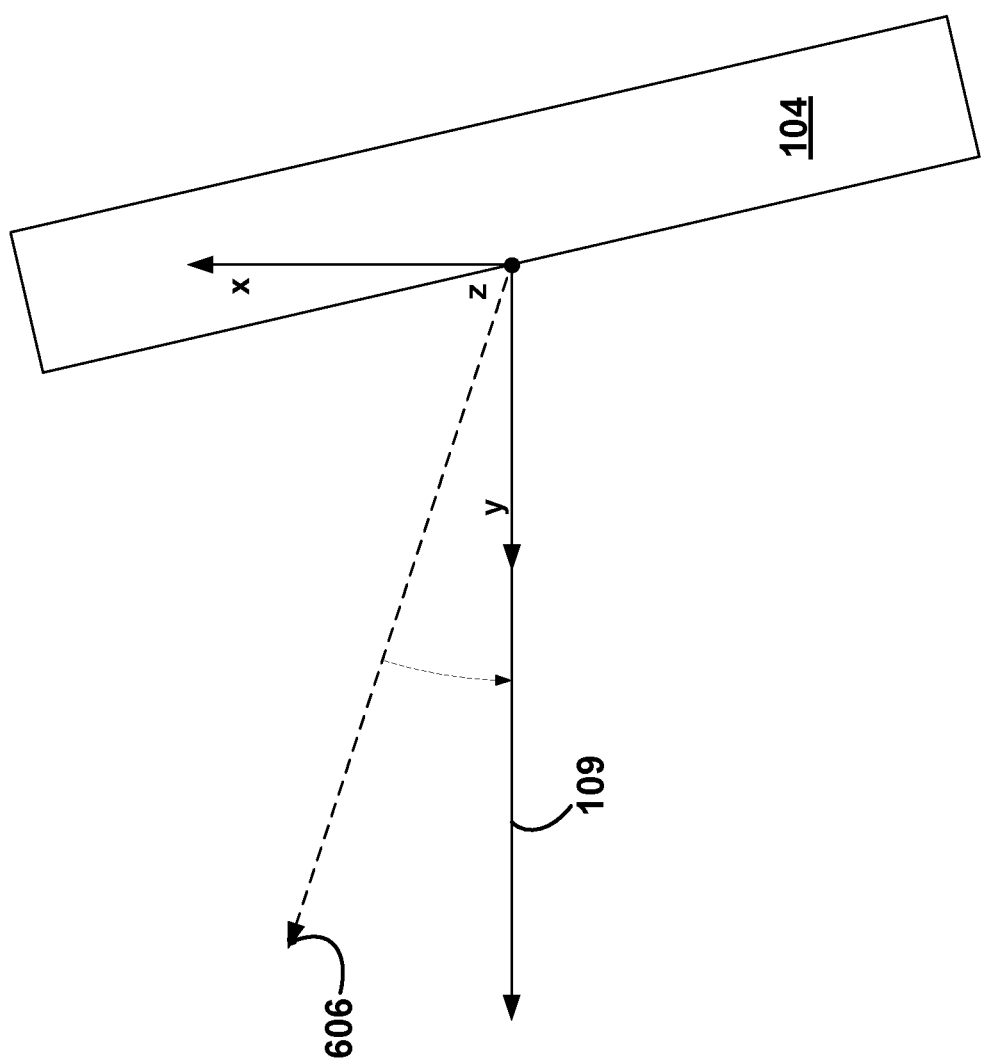
FIG. 9 depicts tilting of a crystal analyzer, according to an example embodiment.

FIG. 9 depicts compensating for misalignment via a one-axis tilt correction of the crystal analyzer 104. The crystal analyzer 104 can be tilted about the z-axis such that the reciprocal lattice vector 109 moves from point 606 to a position such that the reciprocal lattice vector 109 is aligned with the y-axis as shown in FIG. 9. The reciprocal lattice vector 109 now bisects the line segment bounded by the detector 110 and the radiation source 106, to satisfy the Rowland Circle condition. This example may reflect a symmetric configuration.

Figure 10:
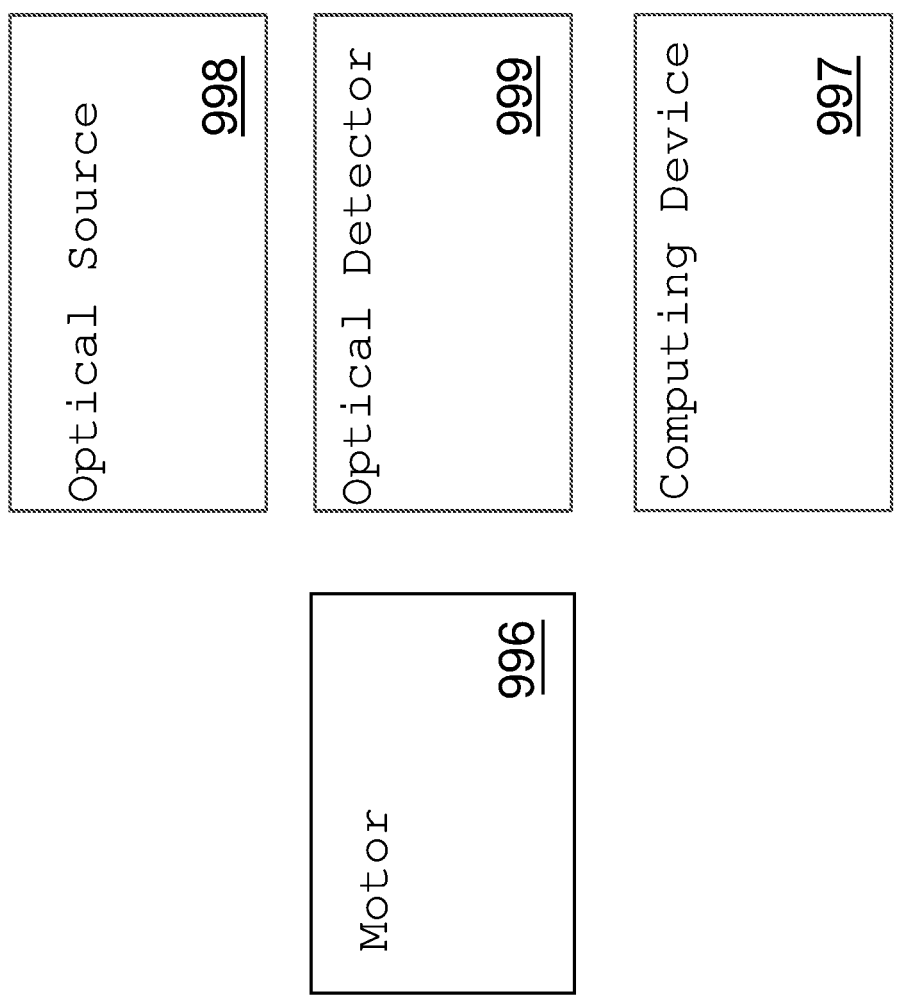
FIG. 10 is a schematic diagram of an optical source, an optical detector, and a computing device, according to an example embodiment.

Referring to both FIGS. 9 and 10, prior to rotating the crystal analyzer 104 about the y-axis, one may use an optical source 998 and an optical detector 999 to align the crystal analyzer 104 such that a surface vector of the crystal analyzer 104 bisects a line segment that is bounded by the optical detector and the optical source. This may provide an approach for making "coarse" alignment adjustments prior to making "fine" adjustments as described above. FIG. 10 also shows a computing device 997 and a motor 996.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A method for aligning a spectrometer, wherein an x-ray radiation source, a crystal analyzer, and a detector of the spectrometer are all positioned on an instrument plane, the method comprising:
   rotating the crystal analyzer about an axis that is within the instrument plane and perpendicular to a rotation plane such that (i) a reciprocal lattice vector of the crystal analyzer is within the instrument plane, or (ii) a component of the reciprocal lattice vector within the rotation plane is perpendicular to the instrument plane, wherein an origin of the reciprocal lattice vector is located on the axis; and
   tilting the crystal analyzer or translating the detector such that the reciprocal lattice vector bisects a line segment that is bounded by the detector and the x-ray radiation source.

2. The method of claim 1, wherein the crystal analyzer comprises one or more of a crystalline material, a spherically curved crystal analyzer, or a doubly-curved crystal analyzer having at least one axis of rotational symmetry.

3. The method claim 1, wherein rotating the crystal analyzer about the axis comprises rotating the crystal analyzer about the axis such that the reciprocal lattice vector of the crystal analyzer is within the instrument plane.

4. The method of claim 3, further comprising:
   after rotating the crystal analyzer about the axis, determining that the reciprocal lattice vector is within the instrument plane; and
   tilting the crystal analyzer such that the reciprocal lattice vector moves parallel to the instrument plane to bisect the line segment.

5. The method of claim 3, further comprising:
   rotating the crystal analyzer about the axis to a first rotational position and a second rotational position;
   determining a first intensity of radiation that is emitted by the x-ray radiation source, scattered by the crystal analyzer in the first rotational position, and detected by the detector;
   determining a second intensity of radiation that is emitted by the x-ray radiation source, scattered by the crystal analyzer in the second rotational position, and detected by the detector; and
   determining a target rotational position for the crystal analyzer based on the first intensity of radiation and the second intensity of radiation,
   wherein rotating the crystal analyzer about the axis such that the reciprocal lattice vector of the crystal analyzer is within the instrument plane comprises rotating the crystal analyzer about the axis to the target rotational position.

6. The method of claim 5, wherein determining a target rotational position for the crystal analyzer comprises selecting the target rotational position for the crystal analyzer from the first rotational position and the second rotational position such that the target rotational position corresponds to a maximum intensity of the first intensity of radiation and the second intensity of radiation.

7. The method of claim 3, further comprising:
after rotating the crystal analyzer about the axis, determining that the reciprocal lattice vector is within the instrument plane; and
translating the detector within the instrument plane such that the line segment becomes bisected by the reciprocal lattice vector.

8. The method of claim 1, wherein rotating the crystal analyzer about the axis comprises rotating the crystal analyzer about the axis such that the component of the reciprocal lattice vector within the rotation plane is perpendicular to the instrument plane.

9. The method of claim 8, further comprising:
after rotating the crystal analyzer about the axis, determining that the component of the reciprocal lattice vector within the rotation plane is perpendicular to the instrument plane; and
tilting the crystal analyzer such that the reciprocal lattice vector moves perpendicularly to the instrument plane so as to subsequently rest in the instrument plane.

10. The method of claim 8, further comprising:
rotating the crystal analyzer about the axis to a first rotational position and a second rotational position;
determining a first intensity of radiation that is emitted by the x-ray radiation source, scattered by the crystal analyzer in the first rotational position, and detected by the detector;
determining a second intensity of radiation that is emitted by the x-ray radiation source, scattered by the crystal analyzer in the second rotational position, and detected by the detector; and
determining a target rotational position for the crystal analyzer based on the first intensity of radiation and the second intensity of radiation,
wherein rotating the crystal analyzer about the axis such that the component of the reciprocal lattice vector within the rotation plane is perpendicular to the instrument plane comprises rotating the crystal analyzer about the axis to the target rotational position.

11. The method of claim 10, wherein determining a target rotational position for the crystal analyzer comprises selecting the target rotational position for the crystal analyzer from the first rotational position and the second rotational position such that the target rotational position corresponds to a minimum intensity of the first intensity of radiation and the second intensity of radiation.

12. The method of claim 1, further comprising: prior to rotating the crystal analyzer about the axis, using an optical source and an optical detector to align the crystal analyzer such that a surface vector of the crystal analyzer bisects a second line segment that is bounded by the optical source and the optical detector.

13. The method of claim 1, further comprising:
marking the crystal analyzer to indicate a rotational position of the crystal analyzer at which the reciprocal lattice vector bisects the line segment that is bounded by the detector and the x-ray radiation source;
removing the crystal analyzer from the spectrometer; and
thereafter mounting the crystal analyzer within the spectrometer in the rotational position.

14. The method of claim 1, wherein rotating the crystal analyzer about the axis comprises rotating the crystal analyzer about the axis manually or via a motor.

15. A spectrometer comprising:
a stage configured to hold a crystal analyzer, wherein the stage is rotatable about a first axis that is within an instrument plane, wherein the stage is rotatable about a second axis that is within the instrument plane or perpendicular to the instrument plane, and wherein the stage is rotationally fixed about a third axis that is perpendicular to both the first axis and the second axis;
an x-ray radiation source that is located on the instrument plane and (i) aligned to emit radiation toward the stage, or (ii) aligned to emit radiation toward a sample, thereby causing radiation to be emitted toward the stage; and
a detector that is located on the instrument plane and configured to detect radiation that is scattered by the crystal analyzer when the crystal analyzer is held by the stage.

16. The spectrometer of claim 15, wherein the second axis is within the instrument plane.

17. A spectrometer comprising:
a stage configured to hold a crystal analyzer, wherein the stage is rotatable about a first axis that is within an instrument plane, wherein the stage is rotationally fixed about a second axis that is perpendicular to the first axis, and wherein the stage is rotationally fixed about a third axis that is perpendicular to both the first axis and the second axis;
an x-ray radiation source that is located on the instrument plane and (i) aligned to emit radiation toward the stage, or (ii) aligned to emit radiation toward a sample, thereby causing radiation to be emitted toward the stage;
a detector that is located on the instrument plane and configured to detect radiation that is scattered by the crystal analyzer when the crystal analyzer is held by the stage; and
a mechanism configured to translate the detector within the instrument plane such that the detector is positioned to detect radiation scattered by the crystal analyzer when the crystal analyzer is held by the stage.

18. A non-transitory computer readable medium storing instructions that, when executed by a computing device, cause the computing device to perform functions comprising:
rotating, via a motor, a crystal analyzer of a spectrometer about an axis that is within an instrument plane of the spectrometer and perpendicular to a rotation plane such that (i) a reciprocal lattice vector of the crystal analyzer is within the instrument plane, or (ii) a component of the reciprocal lattice vector within the rotation plane is perpendicular to the instrument plane, wherein an origin of the reciprocal lattice vector is located on the axis; and
tilting the crystal analyzer via a motor or translating a detector of the spectrometer via a motor such that the reciprocal lattice vector bisects a line segment that is bounded by the detector and a radiation source of the spectrometer.

* * * * *